United States Patent
Kim et al.

(10) Patent No.: US 9,774,404 B2
(45) Date of Patent: Sep. 26, 2017

(54) APPARATUS AND METHOD FOR RECOGNIZING OPTICAL CONNECTOR CONNECTION

(71) Applicant: Electronics and Telecommunications Research Institute, Daejeon (KR)

(72) Inventors: Geun Yong Kim, Gwangju (KR); Sung Chang Kim, Gwangju (KR); Jae In Kim, Gwangju (KR); Dongsoo Lee, Gyeonggi-Do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/070,340

(22) Filed: Mar. 15, 2016

(65) Prior Publication Data
US 2016/0277122 A1 Sep. 22, 2016

(30) Foreign Application Priority Data
Mar. 17, 2015 (KR) .................. 10-2015-0036859

(51) Int. Cl.
H04B 10/272 (2013.01)
H04B 10/80 (2013.01)
H04B 10/077 (2013.01)

(52) U.S. Cl.
CPC ....... *H04B 10/808* (2013.01); *H04B 10/0773* (2013.01); *H04B 10/272* (2013.01)

(58) Field of Classification Search
CPC combination set(s) only.
See application file for complete search history.

(56) References Cited

U.S. PATENT DOCUMENTS

| 2007/0283073 A1* | 12/2007 | Doak | G06F 13/387 710/305 |
| 2008/0279555 A1* | 11/2008 | Horiuchi | H04L 29/06027 398/71 |
| 2008/0309465 A1* | 12/2008 | Ochiai | G06K 7/0008 340/10.51 |

(Continued)

FOREIGN PATENT DOCUMENTS

| CN | 102307107 A | 1/2012 |
| KR | 2010-0009959 U | 10/2010 |

OTHER PUBLICATIONS

Osman Gebizlioglu, et al., "TR-311 Fiber Infrastructure Management System: Architecture and Requirements," Broadband Forum, Technical Report, vol. 1, pp. 1-35, Feb. 2015.

(Continued)

*Primary Examiner* — David Payne
*Assistant Examiner* — Omar S Ismail
(74) *Attorney, Agent, or Firm* — Nelson Mullins Riley & Scarborough LLP; Anthony A. Laurentano

(57) ABSTRACT

Provided is an apparatus of recognizing optical connector connection including an IC tag connection unit configured to provide bus power and detect whether the optical connector is connected to an optical adapter, an IC tag configured to store an IC tag ID uniquely given to the optical connector, which is connected to a corresponding optical cable, and to receive the bus power to be driven for bus communication, and an IC tag ID obtaining unit configured to obtain the IC tag ID stored in the IC tag through the IC tag connection unit, when the optical connector is connected to the optical adapter.

15 Claims, 3 Drawing Sheets

(56) References Cited

U.S. PATENT DOCUMENTS

| | | |
|---|---|---|
| 2009/0161553 A1 | 6/2009 | Kim et al. |
| 2010/0079248 A1* | 4/2010 | Greveling ............ G02B 6/3879 340/10.1 |
| 2011/0002461 A1* | 1/2011 | Erhart ..................... H04L 9/302 380/44 |
| 2011/0037568 A1 | 2/2011 | Kim et al. |
| 2014/0016901 A1 | 1/2014 | Lambourn et al. |
| 2014/0016930 A1* | 1/2014 | Smith .............. H04B 10/07955 398/38 |

OTHER PUBLICATIONS

Shen Chengbin, et al., "TR-287 PON Optical-Layer Management," Broadband Forum, Technical Report, vol. 1, pp. 1-49, Jun. 2014.

\* cited by examiner

APPARATUS AND METHOD FOR RECOGNIZING OPTICAL CONNECTOR CONNECTION

CROSS-REFERENCE TO RELATED APPLICATIONS

This U.S. non-provisional patent application claims priority under 35 U.S.C. §119 of Korean Patent Application No. 10-2015-0036859, filed on Mar. 17, 2015, the entire contents of which are hereby incorporated by reference.

BACKGROUND

The present disclosure herein relates to optical distribution network management, and more particularly, to an apparatus and method for recognizing optical connector connection for automatically recognizing an optical connection point.

As point-to-point optical network technology, passive optical network (PON) technology is under standardization by the IEEE and ITU-T, and until now, Ethernet PON (EPON) and Giga-capable PON (GPON) technologies, which provide a transmission speed of 1 Gbps or 2.5 Gbps per PON link, have been mainly used.

In addition, commercialization of 10G EPON and XG-PON (i.e. 10 Gigabit-capable PON) technologies, which provide 10 Gbps transmission speed per link, is near at hand, and time and wavelength division multiplexing PON (TWDM-PON) technology targeting 40 Gbps transmission speed is under standardization by ITU-T SC15.

Due to recently rapidly increasing mobile data traffic, a request for PON capable of effectively accommodating the mobile data traffic becomes higher The PON technology, which is representative technology of FTTH/B for providing a rapid transmission speed to subscribers by using optical fibers, enables relatively expensive optical communication technology to be constructed and operated at a low cost and is rapidly replacing existing copper line based technologies such as xDSL and HFC, etc. However, compared to optical fibers and nodes, which are increasing every year, optical network infra management is being manually performed (e.g. paper label-based recognition for optical distribution ports). Such a manual connection and recognition method for optical connection points lowers accuracy of network topology information to make it difficult to provide a rapid service.

Connection management between optical connectors and optical adaptors in an optical distribution network (ODN) is performed by a field engineer in a manual manner that identification is performed through paper labels. Accordingly, even in a view of service provider who runs a network, reality is that it is difficult to know how the ODN is coupled unless the engineer directly checks with his/her own eyes in the field. Due to new network service subscribers or existing subscribers' quitting, environment settings of optical connectors in an optical distribution frame are periodically changed. Then it is difficult to distinguish the optical connectors from the optical adaptors in the optical distribution frame to cause frequent binding errors and service delivery delays.

In order to address such limitations, NTT in Japan proceeds research and development to make it easy to recognize an optical fiber infra by using barcodes or quick response (QR) codes on optical connectors, splitters, and optical distribution frames, which configure an optical distribution network. On the other hand, Huawei in China develops an intelligent ODN with an ODN management platform and makes an effort in marketing and standardization.

In order to manage optical connection points in the ODN, technology for recognizing whether an optical connector is connected is necessary. Although it is known that RFID technology is used for recognizing optical connector connection, it is not free to manufacture a tag shape and in particular, a reader in which wireless communication technology is realized becomes complex. In such optical connector connection recognition technology, a low realization cost and low power driving are strongly required.

SUMMARY

An embodiment of the inventive concept provides an apparatus of recognizing optical connector connection including: an IC tag connection unit configured to provide bus power and detect whether the optical connector is connected to an optical adapter; an IC tag configured to store an IC tag ID uniquely given to the optical connector, which is connected to a corresponding optical cable, and to receive the bus power to be driven for bus communication; and an IC tag ID obtaining unit configured to obtain the IC tag ID stored in the IC tag through the IC tag connection unit, when the optical connector is connected to the optical adapter.

In an embodiment, the optical adapter may be connected to an optical power distributor through an optical cable, and the bus power may be Inter-Integrated Circuit (I2C) bus power or universal serial bus power for providing a power supply voltage and a ground voltage, and the IC tag connection unit may be attached to the optical adaptor, or installed inside the optical adapter in an integrated type, and the IC tag may include: a storage circuit configured to store the IC tag ID in a nonvolatile manner even when the bus power is off; and a protection circuit configured to provide the bus power to the storage circuit and protect the storage circuit from a malfunction occurring environment.

In an embodiment, the IC tag obtaining unit may include: an interface switch operationally connected to the IC tag connection unit and configured to perform signal interfacing necessary for obtaining the IC tag ID; and a microprocessor configured to control the interface switch, check ID validity at a time of receiving the IC tag ID stored in the IC tag, and store or transmit the IC tag ID.

In an embodiments of the inventive concept, a method for recognizing optical connector connection includes: installing an IC tag configured to store an IC tag ID for identifying optical connector connection for each optical connector, which connects an optical cable to an optical adapter; providing I2C bus power for enabling the IC tag to operate when the optical cable is connected to the optical adapter; and obtaining the IC tag ID stored in the IC tag through serial bus communication and analyzing the IC tag ID.

In an embodiments of the inventive concept, an apparatus for recognizing optical connector connection includes: an IC tag connection unit configured to provide bus power to an IC tag for storing an IC tag ID uniquely given to an optical connector when the optical connector for optical-cable-connection is connected to an optical adapter; and an IC tag ID obtaining unit configured to obtain the IC tag ID stored in the IC tag through the IC tag connection unit so as to recognize an optical connection point by serial bus communication, when the optical connector is connected to the optical adapter.

In an embodiment, the IC tag may include: EEROM configured to store the IC tag ID; and a protection circuit disposed between the EEPROM and the IC tag obtaining unit and configured to perform a circuit protection function, the protection circuit may include: a power supply voltage terminal and a ground voltage terminal for receiving the bus power; and signal terminals for the serial bus communication, and when the optical connector is connected to the optical adapter, the power supply voltage terminal and the ground voltage terminal may be connected to the IC tag connection unit earlier than the signal terminals.

In an embodiments of the inventive concept, a method for recognizing optical connector connection includes: installing an IC tag configured to store an IC tag ID for identifying optical connection in each of a plurality of optical connectors, which connect optical cables to a plurality of optical adapters; selectively connecting a IC tag connection unit attached to each of the plurality of optical adapters through a communication line; receiving the IC tag ID through the selectively connected IC tag connection unit and when it is determined that the received IC tag ID is valid, recognizing that an optical connector corresponding to an optical adapter is in a normally connected state.

In an embodiment, the selectively connecting of the IC tag connection unit through the serial communication line may be performed at each preset check period, and when the optical connector is recognized to be in the normally connected state, a color of a light emitting diode installed in a corresponding IC tag connection unit may be controlled to be a set display color.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
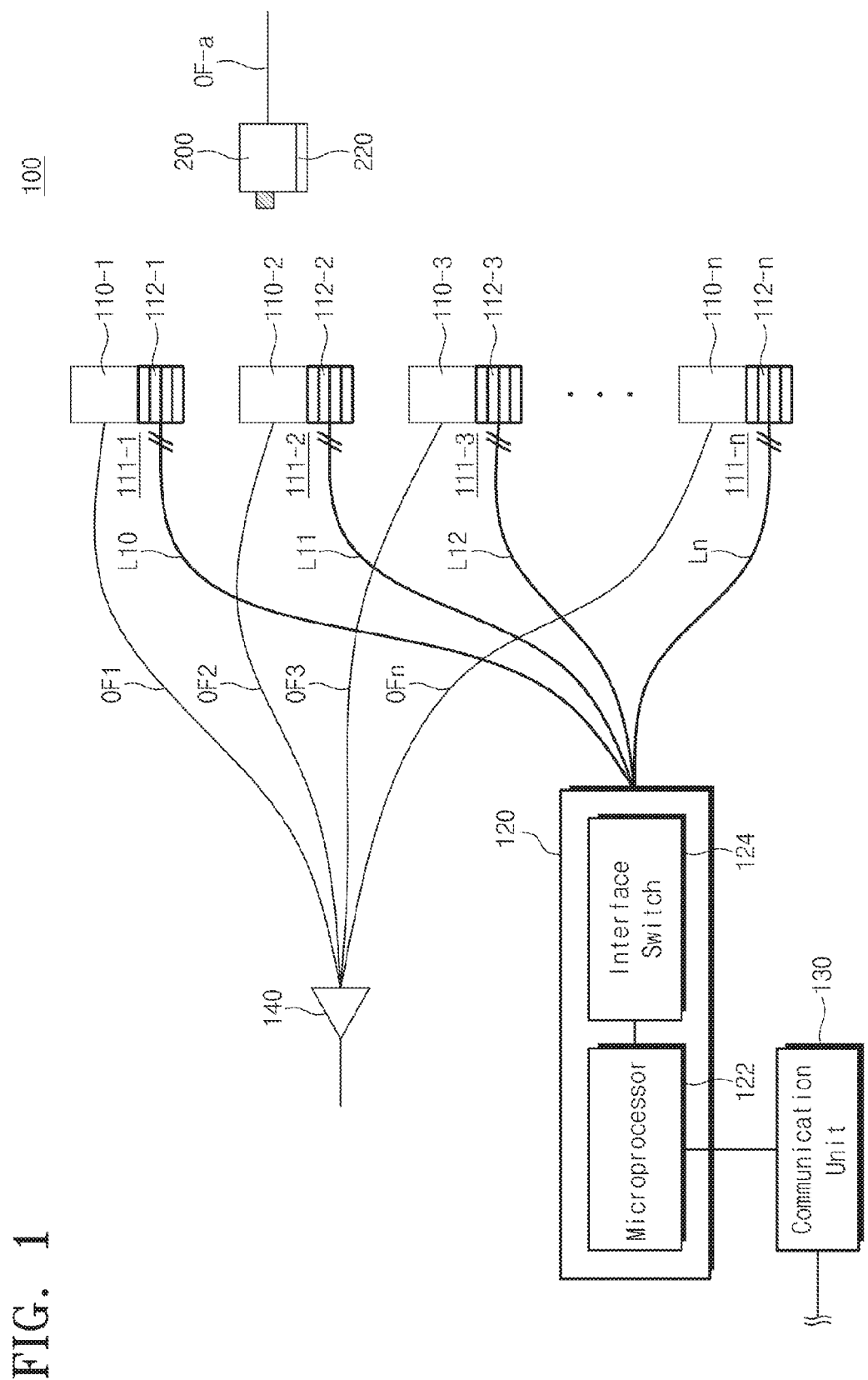
FIG. 1 is a block diagram of an optical connector connection recognition apparatus according to an embodiment of the inventive concept.

The foregoing objectives and other objectives, features and advantages of the present invention will become more readily apparent through reviewing the following detailed description and accompanying drawings. Accordingly, the present invention is not limited to the following embodiments but embodied in other types. Rather, these embodiments are provided so that this disclosure will be thorough and complete, and will fully convey the scope of the present invention to those skilled in the art.

In the present disclosure, if certain devices or lines are described as being connected to a target device block, they are not only directly connected to the target device block, but also connected to the target device block by means of any other device.

Also, the same or similar reference numerals provided in each drawing denote the same or similar components. In some drawings, connection relations between devices and lines are merely shown for efficient description of the technical spirit, and therefore other devices or circuit blocks may be further provided.

Exemplary embodiments set forth herein may include complementary embodiments thereof, and it will be noted that a general operation of a digital signal transmitting apparatus may be omitted so as not to obscure the essential point of the inventive concept.

FIG. 1 is a block diagram of an optical connector connection recognition apparatus according to an embodiment of the inventive concept.

Referring to FIG. 1, an optical connector connection recognition apparatus 100 includes an IC tag connection unit 112-1 for providing bus power and detecting whether an optical connector 200 is connected to an optical adaptor 110-1, an IC tag 220 for storing an IC tag ID uniquely given to the optical connector 200, which is correspondingly connected to an optical cable, and for receiving the bus power to be driven in order to perform bus communication, and an IC tag ID obtaining unit 120 for obtaining the IC tag ID stored in the IC tag 220 through the IC tag connection unit 112-1 when the optical connector 200 is connected to the optical adaptor 110-1.

The optical connector connection recognition apparatus 110 may be applied to optical terminal equipment including an optical splitter for optical power distribution in an ODN.

When a plurality of optical adaptors 110-1, 110-2, 110-3, and 110-n are installed in the optical connector connection recognition apparatus 100, a plurality of IC tag connection units 112-1, 112-2, 112-3, and 112-n may be respectively installed in the plurality of optical adaptors, where n is a natural number of 2 or greater.

The optical adaptor 110-1 may be connected to an optical power distributor 140 through an optical cable OF1 and the optical adaptor 110-2 may be connected to the optical power distributor 140 through an optical cable OF2. In addition, the optical adaptor 110-3 may be connected to the optical power distributor 140 through an optical cable OF3 and the optical adaptor 110-n may be connected to the optical power distributor 140 through an optical cable OFn.

Here, the bus power may be Inter-Integrated Circuit (I2C) bus power or universal serial bus (USB) power for providing power source voltage of 5 V or lower and the ground voltage of 0 V.

The IC tag connection unit 112-1 may be attached to the optical adaptor 110-1 or installed in an integrated type inside the optical adaptor 110-1.

Figure 3:
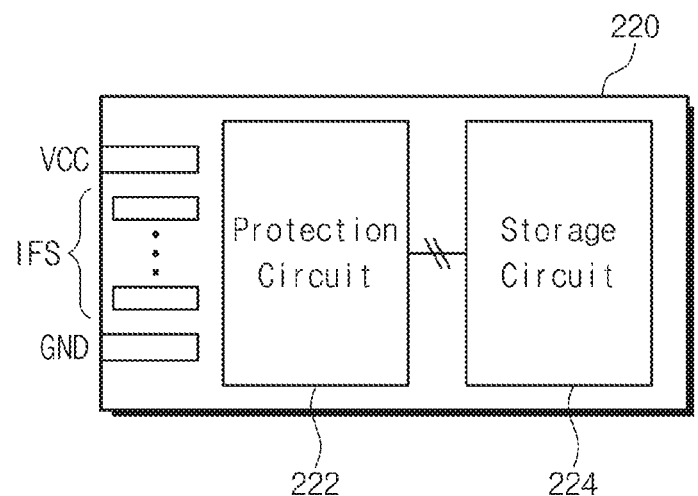
FIG. 3 is an exemplary configuration diagram of an IC tag applied to FIG. 1.

The IC tag 220 may be provided with a storage circuit for storing an IC tag ID and a protection circuit as illustrated in FIG. 3.

The IC tag ID obtaining unit 120 may include an interface switch 124, which is operationally connected to the IC tag connection unit for bus communication and performs signal interfacing necessary for obtaining the IC tag ID.

The IC tag ID obtaining unit 120 may include a microprocessor 122 for controlling the interface switch 124, checking ID validity at the time of receiving the IC tag ID, which is stored in the IC tag 220, and storing or transmitting the IC tag ID.

In the embodiment of the inventive concept, as illustrated in FIG. 1, the IC tag 220 for storing the IC tag ID for identifying optical connector connection is installed in each optical connector 200 for connecting an optical cable OF-a to the optical adapter 110-1.

When the optical cable OF-a is connected to the optical adaptor 110-1, bus power is supplied through the IC tag connection unit 112-1 in order to operate the IC tag 220.

Accordingly, when the interface switch 124 is switched to the communication line L10, the IC tag ID stored in the IC tag 220 is provided to the microprocessor 122 via the IC tag connection unit 112-1 and the communication line L10. In the end, the microprocessor 122 may obtain and analyze the IC tag ID through serial bus communication. When the obtained IC tag ID is valid, the microprocessor 122 may determine that the optical connector is normally connected to the optical adapter, which functions as a connection port. In addition, when the IC tag ID is not obtained or the IC tag ID is not valid, the microprocessor 122 may determine that the optical connector is not connected to or is abnormally connected to the adapter.

In FIG. 1, when the interface switch 124 is connected to the communication line L10, the microprocessor 122 may receive the IC tag ID of the corresponding optical connector through the IC tag connection unit 112-1. Furthermore, when the interface switch 124 is connected to the communication line Ln, the microprocessor 122 may receive the IC tag ID of the corresponding optical connector through the IC tag connection unit 112-n.

The IC tag ID may be read through the I2C communication or USB communication to be transmitted to the microprocessor 122 through the communication line.

The microprocessor 122 may transmit the obtained IC tag ID to a management server through the communication unit 130.

Figure 2:
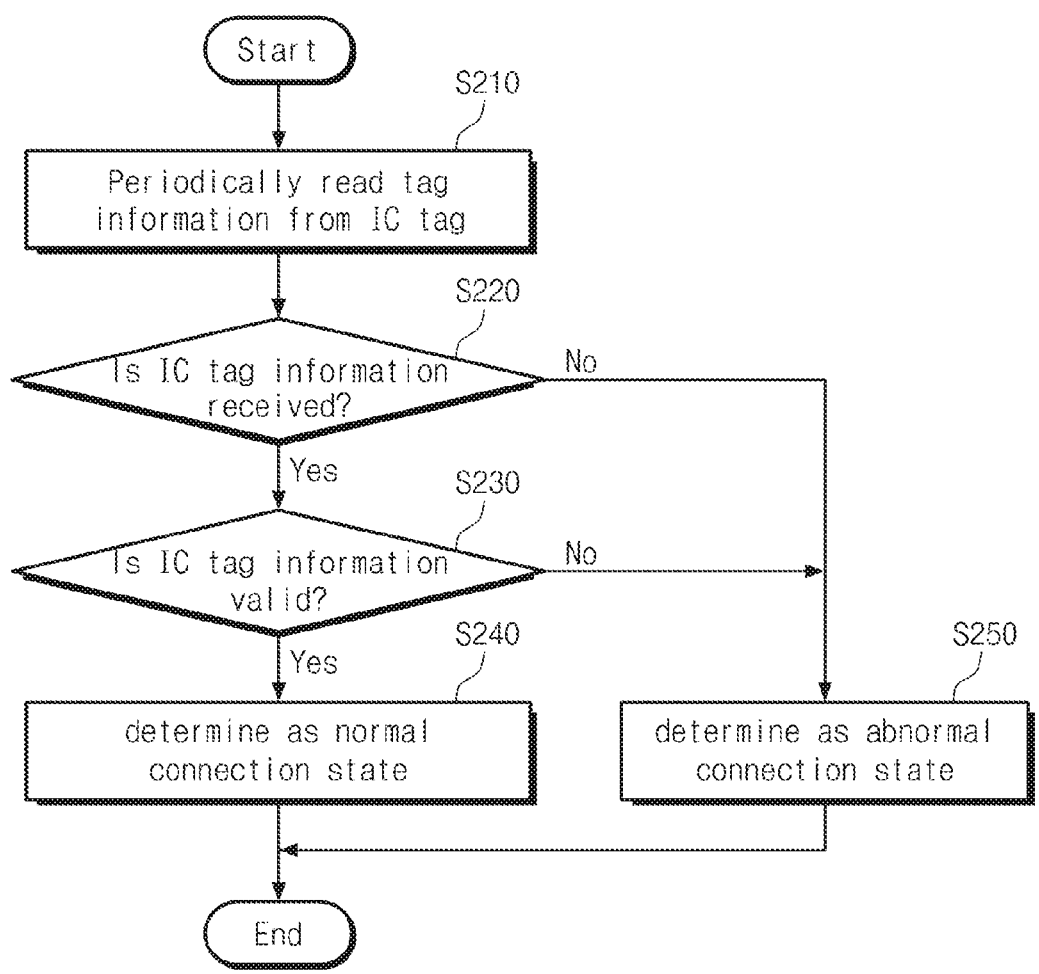
FIG. 2 is a flowchart of optical connector connection detection according to an embodiment of the inventive concept.

FIG. 2 is a flowchart of an operation control of optical connector connection recognition according to FIG. 1.

Referring to FIG. 2, the microprocessor 122 may selectively connect the IC tag connection unit 112-1 through the I2C or USB communication line (e.g. L10) for each preset check period. When the IC tag connection unit 112-1 is connected to the interface switch 124, the IC tag connection unit 112-1 receives bus power from the IC tag ID obtaining unit 120.

In operation S210, the microprocessor 122 controls the interface switch 124 to attempt to read IC tag information, namely, the IC tag ID.

In operation S220, the microprocessor 122 checks, as the result of the read attempt, whether the IC tag information, namely, the IC tag ID is received. In operation S230, the microprocessor 122 checks whether the IC tag information, namely, the IC tag ID is valid.

When the IC tag ID is valid, in operation S240, the microprocessor 122 recognizes the optical connector to be normally connected to the optical adapter and determines to be in a normal connection state.

On the other hand, when the IC tag ID is not received or the received IC tag ID is not valid, the microprocessor 122 determines that the optical connector is not connected or is abnormally connected to the optical adapter and determines to be in an abnormal connection state.

Validity determination for the received IC tag ID may be achieved by checking whether the received IC tag ID exists in a pre-registered IC tag ID registration table. In the end, each unique IC tag ID is stored in each IC tag, which corresponds to each optical connector, and is also stored in the IC tag ID registration table. The IC tag ID registration table may be managed by the microprocessor 122.

When it is recognized that the optical connector is in the normal connection state, a color of a light emitting diode (LED) installed in the corresponding IC tag connection unit may be controlled to be a set display color by the microprocessor.

For example, when it is recognized that the optical connector is in the normal connection state, the color of the LED may be green. Furthermore, in the case of the abnormal connection state, the LED color may be, for example, red.

When receiving the IC tag ID stored in the IC tag, the microprocessor 122 may check ID validity and then transmit the IC tag ID to an ODN management server outside a network through the communication line of the communication unit 130.

FIG. 3 is an exemplary configuration diagram of an IC tag applied to FIG. 1.

Referring to FIG. 3, the IC tag 220 may include a storage circuit 224 for storing the IC tag ID in a nonvolatile manner even when the bus power is off, and a protection circuit 222 for providing the bus power to the storage circuit 224 and protecting a signal interfacing function for enabling the bus communication to be performed and the storage circuit 224 from a malfunction occurring environment.

The protection circuit 222 may include a power supply voltage terminal VCC and the ground voltage terminal GND for receiving the USB power, and signal terminals IFS for serial bus communication.

Here, the power supply terminals VCC and GND may further extend to the outside compared to the signal terminals IFS and be installed. Accordingly, when the optical connector is connected to the optical adapter, the power supply voltage terminal and ground terminal are connected to the IC tag connection unit earlier than the signal terminals. In the end, when power supply terminals are connected earlier than the signal terminals, an invalid error value is prevented from being delivered to the IC tag ID obtaining unit 120 at the time of initially supplying power.

Figure 4:
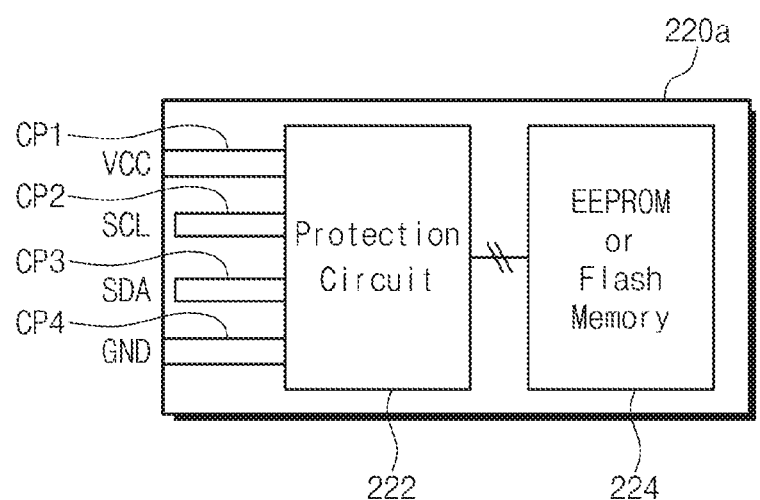
FIG. 4 is another exemplary configuration diagram of an IC tag applied to FIG. 1.

FIG. 4 is another exemplary configuration diagram of an IC tag applied to FIG. 1.

The IC tag 220a includes EEPROM 224 for storing the IC tag ID and a protection circuit 222, which is located between the EEPROM 224 and the IC tag ID obtaining unit and performs a circuit protection function.

In FIG. 4, cable connection terminals CP1 to CP4 may correspond to power supply voltage terminal VCC, ground voltage terminal GND, and signal terminals IFS for serial bus communication. Here, the signal lines SCL and SDA are a clock signal line and a data line for I2C communication, and correspond to the signal terminals IFS in FIG. 3.

In FIG. 4, a signal interface between the EEPROM 224 and the microprocessor 122 may be realized with an I2C interface. The EEPROM or a NAND or OR type flash memory may perform I2C communication. Accordingly, the IC tag ID, which is read through the I2C interface, is applied to the microprocessor 122 through the IC tag connection unit 112-1.

Although the IC tag ID is mainly obtained through the I2C communication in the embodiments, the embodiments of the inventive concept are not limited thereto and USB communication or SPI communication may be used for reading the IC tag ID.

On the other hand, the EEPROM of FIG. 4 may be replaced with at least one of a flash memory, Magnetic RAM (MRAM), Spin-Transfer Torque MRAM, Conductive bridging RAM (CBRAM), Ferroelectric RAM (FeRAM), Phase change RAM (PRAM) also referred to Ovonic Unified Memory (OUM), Resistive RAM (RRAM or ReRAM), Nanotube RRAM, Polymer RAM (PoRAM), Nano Floating Gate Memory (NFGM), holographic memory, Molecular Electronics Memory Device, or Insulator Resistance Change Memory.

Technologies related to smart ODN technology is under discussion in the international standardization organization. In the ITU-T that is the international standardization organization, Q17 "Maintenance and operation of optical fiber cable networks" group of SG15 WP2 "Optical access/transport network technologies and physical infrastructures" proceeds standardization of Fiber O&M issue. Recently, with a progress of technical development for automation of optical layer management, standardization for various fiber identification technologies such as L.gpsm or L.pneid is in progress.

A full service access network (FSAN) group made a new study group with a topic of "optical distribution network monitoring" under an Interoperability Task Group in the 2011 2nd quarter conference held in Berlin, Germany.

The purpose of this study group is to collect requirements of FSAN member companies in relation to ODN monitoring and to define proper technical solutions corresponding thereto. In addition, this study group targeted to cooperate with fiber access network (FAN) WG of broadband forum (BBF) and to complete WT-297 technical documents of the BBF. Thereafter, through study group activities till 2013, various contributions, which became backbone of BBF WT-287, were announced.

The BBF Operations & Network Management WG proceeds standardization of WT-311 "Fiber Infrastructure Management System Architecture and Requirements". WT-311 announced a structure and necessity of intelligent ODN together with Huawei, China Telecom, RITT, ZTE Corporation, and Cambridge Industries Group Limited in BBF 2Q meeting held in Albuquerque, N. Mex., USA in May 2012, was specified as SD-311 in November 2012 to proceed studies, and was determined as WT-311 in September 2013 to proceed to Ver. 4 as of November 2014.

The structure of the inventive concept may be advantageous in a case of managing an ODN in real time through automatic recognition of an optical fiber, optical distribution frame, splitter and connector. This is because in the inventive concept, a recognition device may be driven with bus power, not with constant power, while the structure of the installed optical distribution frame or optical splitter is maintained without change.

According to embodiments of the inventive concept, compared to a recognition method through an RFID tag, power consumption may be reduced and relatively low cost realization is enabled. In addition, while an existing structure of an optical distribution frame or optical splitter is maintained without change, a recognition device may be driven with bus power, not with constant power.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An apparatus of recognizing optical connector connection comprising:
    an adapter assembly having an optical adapter and an IC tag connection unit configured to provide bus power and detect whether an optical connector is connected to the optical adapter;
    a tag assembly separate and distinct from the adapter assembly having the optical connector and an IC tag configured to store an IC tag ID uniquely given to the optical connector, which is connected to a corresponding optical cable, and to receive the bus power from the IC tag connection unit when coupled thereto to be driven for bus communication; and
    an IC tag ID obtaining unit coupled to the IC tag connection unit via a communication line and configured to obtain the IC tag ID stored in the IC tag through the IC tag connection unit, when the optical connector is connected to the optical adapter.

2. The apparatus of claim 1, wherein the optical adapter is connected to an optical power distributor through an optical cable.

3. The apparatus of claim 1, wherein the bus power is Inter-Integrated Circuit (I2C) bus power for providing a power supply voltage and a ground voltage.

4. The apparatus of claim 1, wherein the IC tag connection unit is attached to the optical adaptor.

5. The apparatus of claim 1, wherein the IC tag connection unit is installed inside the optical adapter in an integrated type.

6. The apparatus of claim 1, wherein the IC tag comprises:
    a storage circuit configured to store the IC tag ID in a nonvolatile manner even when the bus power is off; and
    a protection circuit configured to provide the bus power to the storage circuit and protect the storage circuit from a malfunction occurring environment.

7. The apparatus of claim 1, wherein the IC tag obtaining unit comprises:
    an interface switch operationally connected to the IC tag connection unit and configured to perform signal interfacing necessary for obtaining the IC tag ID; and
    a microprocessor configured to control the interface switch, check ID validity at a time of receiving the IC tag ID stored in the IC tag, and store or transmit the IC tag ID.

8. A method for recognizing optical connector connection comprising:
    providing an adapter assembly having an optical adapter and an IC tag connection unit configured to provide bus power and detect whether an optical connector is connected to the optical adapter;
    providing a tag assembly separate and distinct from the adapter assembly having the optical connector and an IC tag configured to store an IC tag ID for identifying optical connector connection for each optical connector, which connects an optical cable to an optical adapter;
    providing I2C bus power from the IC tag connection unit when coupled thereto for enabling the IC tag to operate when the optical cable is connected to the optical adapter; and
    obtaining the IC tag ID stored in the IC tag through serial bus communication and analyzing the IC tag ID.

9. The method of claim 8, wherein the IC tag ID is read through the I2C communication and then is obtained through a microprocessor.

10. The method of claim 8, wherein the obtained IC tag ID is transmitted to a management server through a communication unit.

11. An apparatus for recognizing optical connector connection comprising:
    an adapter assembly having an optical adapter and an IC tag connection unit configured to provide bus power to a tag assembly separate and distinct from the adapter assembly having an optical connector and an IC tag for storing an IC tag ID uniquely given to the optical connector when the optical connector for optical-cable-connection is connected to the optical adapter; and an IC tag ID obtaining unit coupled to the IC tag connection unit via a communication line and configured to obtain the IC tag ID stored in the IC tag through the IC tag connection unit so as to recognize an optical connection point by serial bus communication, when the optical connector is connected to the optical adapter.

12. The apparatus of claim 11, wherein the IC tag comprises:
   EEROM configured to store the IC tag ID; and
   a protection circuit disposed between the EEPROM and the IC tag obtaining unit and configured to perform a circuit protection function.

13. The apparatus of claim 12, wherein the protection circuit comprises:
   a power supply voltage terminal and a ground voltage terminal for receiving the bus power; and
   signal terminals for the serial bus communication.

14. The apparatus of claim 13, wherein when the optical connector is connected to the optical adapter, the power supply voltage terminal and the ground voltage terminal are connected to the IC tag connection unit earlier than the signal terminals.

15. The apparatus of claim 13, wherein the IC tag obtaining unit comprises:
   an interface switch operationally connected to the IC tag connection unit for the serial bus communication and configured to perform signal interfacing necessary for obtaining the IC tag ID; and
   a microprocessor configured to control the interface switch, check ID validity at a time of receiving the IC tag ID stored in the IC tag, and then transmit the IC tag ID to an optical distribution network management server through a communication line.

* * * * *